United States Patent [19]
Aggarwal et al.

[11] Patent Number: 5,924,116
[45] Date of Patent: Jul. 13, 1999

[54] COLLABORATIVE CACHING OF A REQUESTED OBJECT BY A LOWER LEVEL NODE AS A FUNCTION OF THE CACHING STATUS OF THE OBJECT AT A HIGHER LEVEL NODE

[75] Inventors: Charu Chandra Aggarwal, Ossining; Peter Kenneth Malkin, Ardsley; Robert Jeffrey Schloss, Briarcliff Manor; Philip Shi-lung Yu, Chappaqua, all of N.Y.

[73] Assignee: International Business Machines Corporation, Armonk, N.Y.

[21] Appl. No.: 08/831,237

[22] Filed: Apr. 2, 1997

[51] Int. Cl.[6] ........................................... G06F 12/08
[52] U.S. Cl. .................. 711/122; 711/130; 395/200.34; 395/200.35; 395/200.43; 395/200.46
[58] Field of Search .................................. 711/122, 119, 711/130; 395/200.34, 200.35, 200.43, 200.46, 200.57, 200.59

[56] References Cited

U.S. PATENT DOCUMENTS

| | | | |
|---|---|---|---|
| 4,755,930 | 7/1988 | Wilson, Jr. et al. | 711/122 |
| 5,008,820 | 4/1991 | Christopher, Jr. et al. | 707/1 |
| 5,063,502 | 11/1991 | Jordan, Jr. | 395/726 |
| 5,222,242 | 6/1993 | Choi et al. | 395/200.57 |
| 5,446,841 | 8/1995 | Kitano et al. | 395/200.43 |
| 5,511,208 | 4/1996 | Boyles et al. | 395/200.53 |
| 5,530,832 | 6/1996 | So et al. | 711/122 |
| 5,682,514 | 10/1997 | Yohe et al. | 711/118 |
| 5,737,546 | 4/1998 | Fenwick et al. | 395/290 |
| 5,781,757 | 7/1998 | Deshpande | 395/297 |

OTHER PUBLICATIONS

Research Report, IBM, "On Caching Policies for Web Objects", C. C. Aggarwal et al., Nov. 8, 1996, pp. 1–20.
Research Report, IBM, "On Disk Caching of Web Objects in Proxy Servers", C. C. Aggarwal et al., Nov. 19, 1996, pp. 1–18.

Fourth International World Wide Web Conference Proceedings, "Caching Proxies, Limitations and Potentials", M. Abrams et al., pp. 119–133, World Wide Web Journal, Oct. 1995.

Technical Report CU–CS–732–94, Univ. of Colorado, Harvest: A Scalable, Customizable Discovery and Access System, C. Mic Bowman et al., Aug. 1995, pp. 1–29.

*Primary Examiner*—Tod R. Swann
*Assistant Examiner*—Felix B. Lee
*Attorney, Agent, or Firm*—Kevin M. Jordan

[57] ABSTRACT

A method and system of collaboratively caching information to allow improved caching decisions by a lower level or sibling node. In a caching hierarchy, the client and/or servers may factor in the caching status at the higher level in deciding whether to cache an object and which objects are to be replaced. The PICS protocol may be used to pass the caching information of some or all the upper hierarchy down the hierarchy. Furthermore, the caching status information can also be used to direct the object request to the closest higher level proxy which has potentially cached the object, instead of blindly requesting it from the next immediate higher level proxy. A selection policy used to select objects for replacement in the cache may be prioritized not only on the size and the frequency of access of the object, but also on the access time required to get the object if it is not cached. The selection policy may also include a selection weight factor wherein each object is assigned a selection weight based on its replacement cost, the object size and how frequently it is modified. Non-uniform size objects may be classified in ranges of selection weights having geometrically increasing intervals. Multiple LRU stacks may be independently maintained wherein each stack contains objects in a certain range of selection weights. In order to choose candidates for replacement, only the least recently used objects in each group need be considered.

31 Claims, 12 Drawing Sheets

The objects are in groups of exponentially increasing selection weights.

Each group is maintained using an LRU mechanism.

COLLABORATIVE CACHING OF A REQUESTED OBJECT BY A LOWER LEVEL NODE AS A FUNCTION OF THE CACHING STATUS OF THE OBJECT AT A HIGHER LEVEL NODE

CROSS-REFERENCE TO RELATED APPLICATIONS

The present invention is related to co-pending U.S. patent application Ser. No. 08/741,412, filed Oct. 29, 1996, entitled "System and Method for Caching Objects of Non-Uniform Size," by Aggarwal et al., IBM Docket No. YO996-226. This co-pending application and the present invention are commonly assigned to the International Business Machines Corporation of Armonk, N.Y. The description set forth in the co-pending application is hereby incorporated by reference in its entirety into the present application.

FIELD OF THE INVENTION

The present invention is related to an improved data processing system. A particular aspect of the present invention is related to a collaborative method of caching objects. A more particular aspect of the present invention is related to a collaborative caching of objects on a hierarchy of servers such as proxy servers on the World Wide Web.

Glossary of terms

While dictionary meanings are also implied by terms used here, the following glossary of some terms may be useful.

Internet

The network of networks, gateways and connected computers that use the TCP/IP suite of protocols.

Client

A client is a computer which typically issues commands to one or more servers which perform the task associated with the command. Another example of a client is an information monitor which receives information from one or more servers.

Server

Any computer that performs a task at the command of one or more computers is a server. A Web server typically supports one or more clients.

World Wide Web (WWW or Web)

The Internet's application that lets people seeking information on the Internet switch from server to server and database to database. Users can click on highlighted words or phrases of interest (hyperlinks), click on graphics such as applets or image maps, fill in forms, and enter URLs. An Internet WWW server supports clients and provides information. The Web can be considered as the Internet with all of the resources addressed as URLs; uses HTTP protocols to transfer information between computers; uses HTML (among other formats) to display the information corresponding to URLs; and provides a point-and-click interface to other URLs.

Universal Resource Locator (URL)

A way to identify or address information on the Internet.

HyperText Markup Language (HTML)

HTML is a standard device-independent representation of content on Web servers. Web servers may deliver content (including hyperlinks) to clients in HTML with confidence that the client will choose an appropriate presentation.

Hypertext transfer protocol (HTTP)

HTTP is an example of a stateless protocol, which means that every request from a client to a server is treated independently. Clients send requests to servers and servers respond using this protocol.

Internet Browser or Web browser

A graphical interface tool that runs Internet protocols such as HTTP, and displays results on the customer's screen. The browser can act as an Internet tour guide, complete with pictorial desktops, directories and search tools used when a user "surfs" the Internet. The Web browser can be a client service which communicates with the World Wide Web servers.

Client cache

Client caches are typically used as primary caches for objects accessed by the client. In a WWW environment, client caches are typically implemented by web browsers and may cache objects accessed during a current invocation, i.e., a nonpersistent cache, or may cache objects across invocations.

Proxy server

A computer which acts as a middleman between the client and the content server. The proxy typically exists for security reasons, caching reasons, or both.

Caching proxies

Specialized servers in a network which can act as agents on the behalf of the client to locate a cached copy of an object. Caching proxies typically serve as secondary or higher level caches, because they are invoked as a result of cache-misses from client caches.

HTTP Daemon (HTTPD)

A server which responds to HTTP requests. The daemon may invoke server sub-applications, for example via the Common Gateway Interface. The HTTPD makes use of TCP/IP communications software which typically allows communications through hardware connections to machines on an intranet and the Internet.

BACKGROUND

The rapid increase in popularity of the World Wide Web (WWW or web) has led to a corresponding increase in the amount of traffic over the Internet. As a result, the web has become a primary bottleneck on network performance. When documents or information are requested by a user who is connected to a server via a slow network link, there can be noticeable latency at the user end. Further, transferring the document or information over the network leads to an increase in the level of traffic over the network. This reduces the bandwidth available for other requests. One way to reduce access latencies is to cache copies of popular documents or information closer to the user, from which the access latencies are more acceptable.

The cache can be implemented at various points on the network. For example, a large university or corporate network may have its own local cache, from which all subscribing users may fetch documents. In some cases, specialized servers called caching proxies, acting as agents on the behalf of the client are implemented in the network to locate a cached copy of a document. Typically, caching proxies serve as secondary or higher level caches, because they are concerned only with cache-misses from (primary) client caches. Client caches are typically part of the web browser, and may store either documents accessed during the current invocation (a nonpersistent cache such as is implemented by Mosaic), or documents accessed across invocations.

Generally speaking, a hierarchy of caches can be formed by the client and server(s). For example, in a corporate network, there can be one or more of a project proxy, a departmental proxy, a divisional proxy and a site proxy, etc. An Internet service provider can implement proxies at one or more of each neighborhood, each sub-region, and each region, etc. The client and/or proxies form a caching hierarchy. In a strict hierarchy, when a cache miss occurs, the (client or) proxy requests the missed object from the immediate higher level of the hierarchy through a caching proxy interface (identical to the HTTP interface as used in the CERN HTTP cache). More recently, in Harvest, "sibling" or "neighborhood" caches may be interrogated upon a cache-miss (see C. M. Brown, et. al., "Harvest: A Scalable, Customizable Discovery and Access System," in Technical Report CU-CS-732-94, Department of Computer Science, University of Colorado, 1994). In either case, the caching decision is made at each local proxy independent of objects cached in other proxies. In other words, caching decisions are made solely as a function of the local cache contents and/or object characteristics.

Thus, there is a need for an improved caching method and system in which the client and/or server(s) collaborate in making caching decisions and in the location of previously cached objects. The present invention addresses such a need.

SUMMARY

In accordance with the aforementioned needs, the present invention is directed to a method and system of collaboratively caching information to allow the client and/or server (s) to make improved caching decisions. A cache manager may be implemented at the client and/or server(s) to take into account the caching status in deciding whether to cache an object and which objects are to be replaced.

A method having features of the present invention for collaboratively caching objects in a caching hierarchy wherein requests for objects are communicated up the hierarchy and objects are communicated down the hierarchy, includes the steps of: communicating down the hierarchy both a caching status of a requested object not cached on a current server and the requested object, in response to a request for the requested object; and caching by a lower level (client or) server of the requested object as a function of the caching status of the requested object at a higher level server, in response to said communicating step.

According to another aspect of the present invention, in an Internet environment, the PICS protocol may be used to communicate caching status (on some or all the upper hierarchy) down the hierarchy. Here, the PICS protocol may be used to communicate the caching status of the higher level server by creating a caching label (also called a CHL value) and using a PICS category value to represent the caching status. Specifically, the caching status information can be stored or communicated as part of a header of the object using the PICS protocol. A "caching hierarchy" PICS label can be defined such that the PICS category value corresponds to the CHL value. The lower level server (or client) can interpret the PICS category value to make better caching decisions. If the object is to be communicated further down the hierarchy, the lower level server can then modify the PICS category value to reflect its caching decision.

Furthermore, the present invention has still other features wherein caching status information can also be used to direct the object request to the closest higher level proxy which has potentially cached the object, instead of blindly requesting it from the immediately higher level proxy.

According to yet another aspect of the present invention, in order to track the caching status, an auxiliary stack is maintained which contains the identity or URL of each object and its caching status, e.g., and the CHL value, on the higher level proxies. This auxiliary stack is preferably maintained in LRU order, and since it only contains identities of objects rather than the objects themselves, the memory required is relatively small if the number of objects in the auxiliary stack is of the same order as that in the main cache. A "time stamp" of the object's last access may also be maintained in the auxiliary stack. The auxiliary stack can also serve as a dynamic "popularity list" such that an object may be admitted to the cache if and only if it appears on the popularity list.

According to still another aspect of the present invention, to reduce the overhead associated with comparing a priority value of each object in the cache, a "selection weight" may be assigned to objects based on their replacement cost, the object size and/or how frequently they are modified. Preferably, objects are classified in ranges of selection weights having geometrically increasing intervals. Specifically, multiple LRU stacks may be independently maintained wherein each LRU stack contains objects in a predetermined range of selection weights. In order to choose candidates for replacement, only the least recently used objects in each group need to be considered.

BRIEF DESCRIPTION OF THE DRAWINGS

These and other improvements are set forth in the following detailed description. For a better understanding of the invention with advantages and features, refer to the description and to the drawings, wherein.

DETAILED DESCRIPTION

Figure 1:
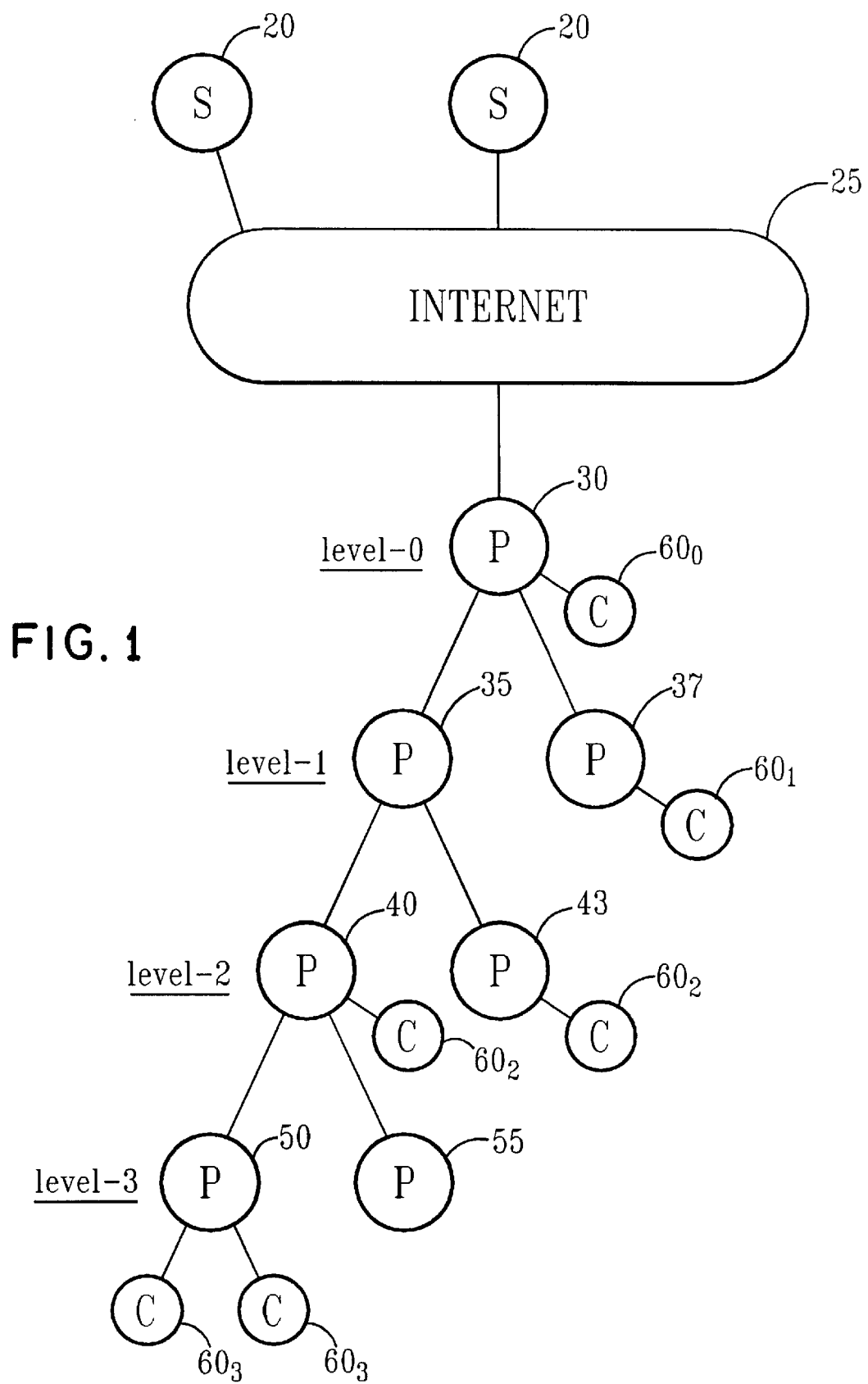
FIG. 1 is a diagram of a high-level architecture of a client-server hierarchy having features of the present invention.

FIG. 1 depicts an example of an overall logical architecture of a hierarchy of proxy servers having features of the present invention. As depicted, a client ($60_0 \ldots 60_3$) may be connected through a hierarchy (level-0 ... level-3) of proxy servers (30 ... 55) to the Internet (25). By way of example only, the proxy hierarchy depicted includes four levels of proxy servers. One skilled in the art will appreciate that there can be any number of levels in the proxy hierarchy and the clients ($60_0 \ldots 60_3$) can in fact be connected to any level thereof. Here, the highest level (level-0) proxy (30) connects to the Internet. There are two level-1 proxies (35 and 37) with one of the level-1 proxies (35) connected to two level-2 proxies (40 and 43). A client ($60_3$) is coupled to its immediately higher level (level-3) proxy (50) and then to its level-2, 1, and 0 proxies (40, 35 and 30), respectively. The client can access various web sites (20) through the Internet. The client may have its own cache which is typically used as a primary cache for objects accessed by the client. Examples of objects include: any digitally transmitted content such as image files or web pages; and executable content such as Java Applets, and servlets. A servlet moves code in the opposite way to an Applet; that is it allows a client program to upload additional program code to a server. The servlet's code is then instantiated and executed in the server. Thus, it is understood that a client can also act as a content server. In a WWW environment, clients include client caches which are typically implemented by web browsers and may cache objects accessed during a current invocation, i.e., a nonpersistent cache, or may cache objects across invocations. If the object is not in the client cache, the proxy servers can act as agents on the behalf of the client to locate a cached copy of a document, if possible. Caching proxies typically serve as secondary or higher level caches, because they are only invoked as a result of a cache-misses from client caches. Those skilled in the art will realize that a hierarchy of "caching servers" could comprise a client 60 having a client cache and a single caching server.

From the view point of client $60_3$, certain proxies (55, 43 and 37) are not part of its proxy hierarchy. Those skilled in the art will appreciate that although a typical communication path is via the immediately higher level proxy, a lower level proxy may communicate directly to other higher level proxies or the Internet.

In a conventional proxy hierarchy, upon a cache-miss (at the client 60 or a given proxy in the hierarchy), a request for the missed object is made to the next higher level proxy. If the higher level proxy has previously cached the object, it will pass down the object. Otherwise, it will try to obtain the object from its next higher level proxy. Once the object is obtained, it is passed down to the next lower level proxy requesting the object.

Figure 2A:
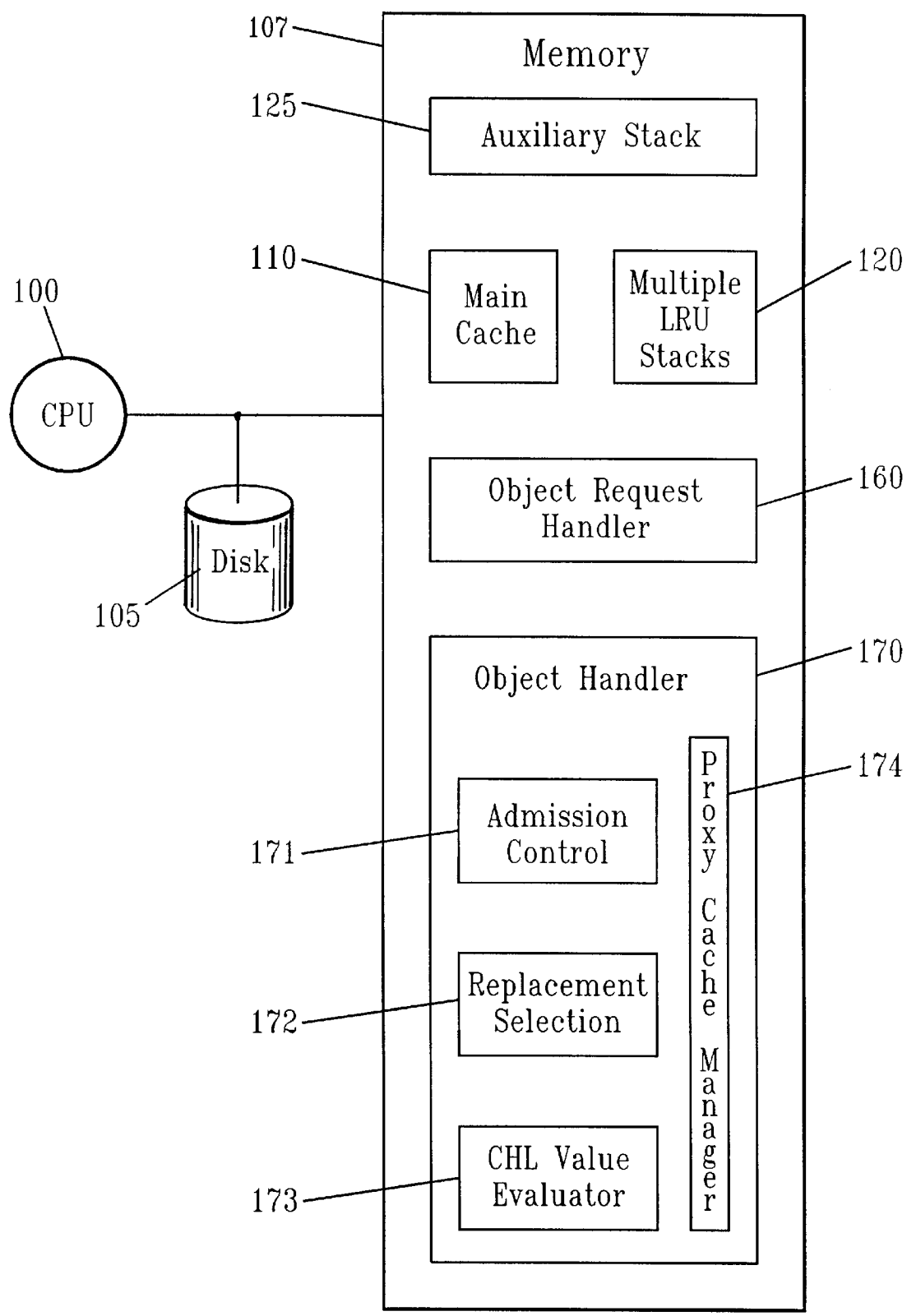
FIG. 2a depicts an example of the server of FIG. 1.

FIG. 2*a* depicts a more detailed example of a collaborative caching server having features of the present invention. By way of overview, the collaborative caching server (30 . . . 50) of the present invention passes information on its caching decision along with the object to the next (lower) level proxy. In fact, not only its own caching decision, but also the caching decision(s) of the entire upper hierarchy can be passed down.

Another issue related to the current invention is how to pass caching information down the hierarchy. In an Internet implementation, the caching information on an object can be included in its header using existing web protocols. PICS ("Platform for Internet Content Selection") specifies a method of sending meta-information concerning electronic content. PICS is a Web Consortium Protocol Recommendation (see http://www.w3.org/PICS). PICS was first used for sending values-based rating labels, such as "How much nudity is associated with this content," but the format and meaning of the meta-information is fully general. In PICS, meta-information about electronic content is grouped according to the "rating service" or producer-and-intended-usage of the information, and within one such group, any number of categories or dimensions of information may be transmitted. Each category has a range of permitted values, and for a specific piece of content, a particular category may have a single value or multiple values. In addition, the meta-information group (known as a "PICS label") may contain expiration information. There are also facilities for permitting a PICS label to apply to more than one piece of electronic content. Each PICS label for a specific piece of electronic content may be added or removed from the content independently.

For example, an image file may be sent from a server with a single PICS label whose "rating service" field indicates it contains values-based rating labels according to the "SafeSurf" rating system. According to the present invention, as it passes through an enterprise proxy, the image file may also receive a second PICS label whose "rating service" field indicates it contains proxy cache information. As it passes through a departmental proxy, the second PICS label may be stripped. Thus, the client computer may only sees the first PICS label.

HHTP has been augmented with request headers and response headers that support PICS. The technical bodies which define other common application protocols, such as NNTP, are now also considering adding PICS support. As part of these protocols, a list of the types of PICS labels desired may be included with a request. PICS also specifies a query format for receiving PICS information from a central label bureau server. A sample PICS label is: (PICS-1.1 "http://the.rating.service" label for "http://the.content" exp "1997.07.01T08:15-0500" r (n 4 s 3 v 2 1 0)), where the 'n' 's' 'v' '1' are transmit names for various meta-information types, and the applicable values for this content are 4 (for n), 3 (for s), 2 (for v) and 0 (for 1). Only software which recognizes the ID "http://the.rating.service" would know how to interpret these categories and values.

At each proxy, the caching status information of an object in the higher level proxies is referred to herein as the caching hierarchy label (CHL) value of the object. The CHL value can be stored or transmitted as part of the header of the object using the PICS protocol. A "caching hierarchy" PICS label can be defined such that the PICS category value corresponds to the CHL value. As will be discussed in more detail with reference to FIG. 4, the CHL value can be used by a lower level proxy (or client) to make better object caching decisions. A method of determining a CHL value at a given proxy will be discussed with reference to FIG. 11. For example, a binary value representation may be used to determine the CHL value as follows: For an n-th level proxy, the CHL value of an object includes n bits and the k-th bit has a value of one if the (n–k) level proxy has cached the object when it passed the object down the hierarchy. Otherwise, the k-th bit is set to a value of zero. Furthermore, the caching status information can also be used to direct the object request to the closest higher level proxy which has potentially cached the object, instead of requesting from the next immediate higher level proxy.

Referring again to FIG. 1, consider for example a CHL value of an object A. Assume that a level-0 proxy (30) and a level-2 proxy (40) have cached object A and that a level-1 proxy (35) has not cached object A. The CHL value of the object A at a level-3 proxy (50) will thus be "$101_2$" (in binary) or $5_{10}$, (in decimal). Object A's CHL value at the next higher level proxies (35 and 40) is respectively "$1_2$" and "$01_2$". Those skilled in the art will appreciate that there are alternative methods of representing the caching status in the hierarchy. A simpler, but less accurate, method is to use a single bit to represent whether any higher level proxy has cached the object. If the bit is on, then a higher level proxy has cached the object. Otherwise, no higher level proxy has cached the object.

When an object is not currently in the cache in a given proxy server, a threshold decision may be made whether to admit the object to its cache. As will be described in more detail in FIG. 10, the proxy server of the present invention preferably includes admission control logic wherein an object is admitted to the cache as a function of its dynamic access frequency and if necessary, the dynamic access frequency of one or more tentatively identified objects to be replaced in the cache. As will be discussed in more detail in FIGS. 2, and 6–9, the proxy server also includes replacement selection logic for determining which objects to purge.

By way of overview, the replacement selection logic is preferably a function of not only the size and the dynamic access frequency of the object, but also a function of a replacement cost. The replacement cost may be based on the access time required to obtain the object if it is not cached. If an object is cached at a higher level proxy, its access time (or replacement cost) will be reduced. Preferably, the replacement selection logic is such that the likelihood of removal of an object is inversely proportional to the replacement cost.

FIG. 2a depicts a more detailed example of an architecture of the server of FIG. 1. As is conventional, the proxy server includes a CPU (100), a disk (105) such as a magnetic, electronic, or optical storage media for persistent data and/or program/code storage, and a memory (107) for dynamic access and/or execution of the data and/or programs by the CPU (100). Those skilled in the art will appreciate that within the spirit and scope of the present invention, one or more of the components instantiated in the memory (107) could be accessed and maintained directly via disk (105), the network (25), another server, or could be distributed across a plurality of servers. Two important components of the proxy server, preferably embodied as software executable on CPU (100), are an object request handler (160) and an object handler (170) which will be described in more detail with reference to FIGS. 4 and 5, respectively.

Figure 2B:
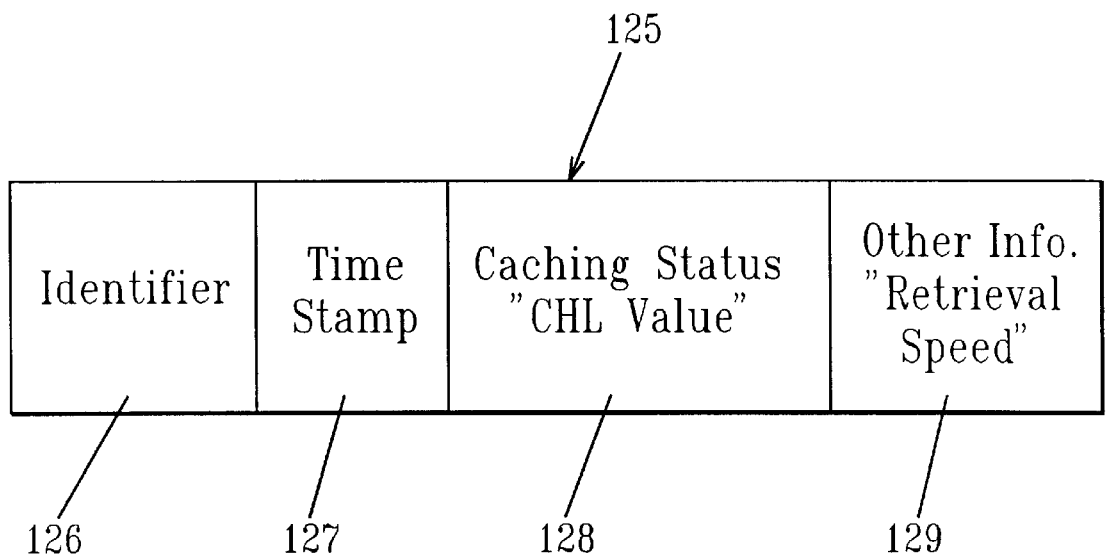
FIG. 2b depicts an example of an entry in the auxiliary stack.

FIG. 2b depicts an example of an entry in the auxiliary stack (125) of FIG. 2a. Each entry in the Auxiliary stack (125) preferably contains an identifier (126) of the object, the object's caching status (128) in the hierarchy, e.g., the CHL value, and a time stamp (127) for the object's last reference or time accessed. The auxiliary stack may also include other information, such as the retrieval speed (129) of the storage for the cached object. In a WWW implementation, the object can be identified by its URL.

Referring again to FIG. 2a, the memory (107) contains several other structures which are also relevant to features of the present invention. As will be discussed in more detail with reference to FIG. 6, the Auxiliary stack (125) may be maintained at each proxy node. The Auxiliary stack (125) can be used by an admission control (171) logic of the object handler (170) to determine if an object should be admitted to the cache. The admission control logic will be discussed in more detail with reference to FIG. 10. As will be discussed in more detail with reference to FIG. 4, the CHL value (128) in the Auxiliary stack (125) can be used by the CHL value evaluator (173) logic to efficiently route object requests through the proxy hierarchy. As will be discussed in more detail with reference to FIG. 5, a proxy cache manager (174) is invoked to determine whether the object O should be cached locally. The replacement selection (172) logic may be used to select objects, if necessary, to be displaced from the cache. As will be discussed in more detail with reference to FIGS. 7–9, replacement selections can be assigned a selection weight which is preferably a function of not only the size and the dynamic access frequency of the object, but also a function of a replacement cost. The replacement cost is based on the access time required to obtain the object if it is not cached. If an object is cached at the higher level proxy, its access time (or replacement cost) will be reduced. Preferably, the replacement selection logic is such that the likelihood of removal of an object is inversely proportional to the replacement cost.

Figure 8:
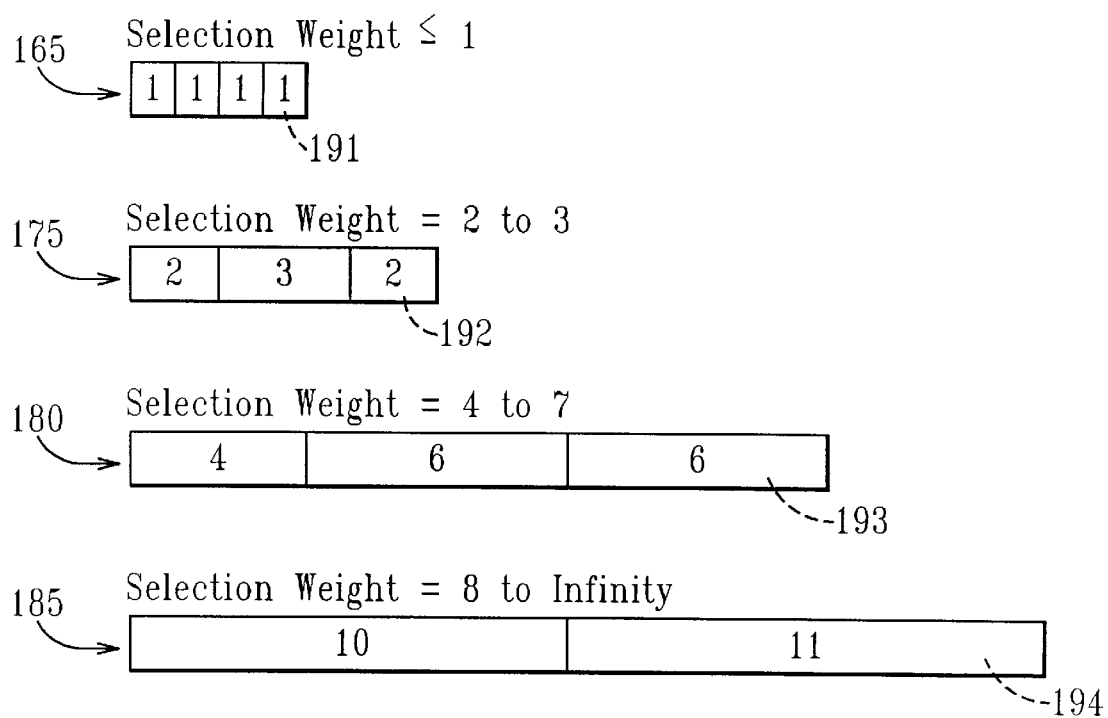
FIG. 8 depicts an example of the multiple LRU stacks.

Alternatively, as will be discussed in more detail in FIG. 9, the replacement selection (172) logic may also utilize multiple LRU stacks (120) wherein objects are classified in ranges of selection weights having geometrically increasing intervals. An example of the multiple LRU stacks (120) is depicted in FIG. 8. Those skilled in the art will appreciate that the present invention is equally applicable to either method (or combination thereof) and may be used either for main memory (110) or disk caching (105).

Figure 3:
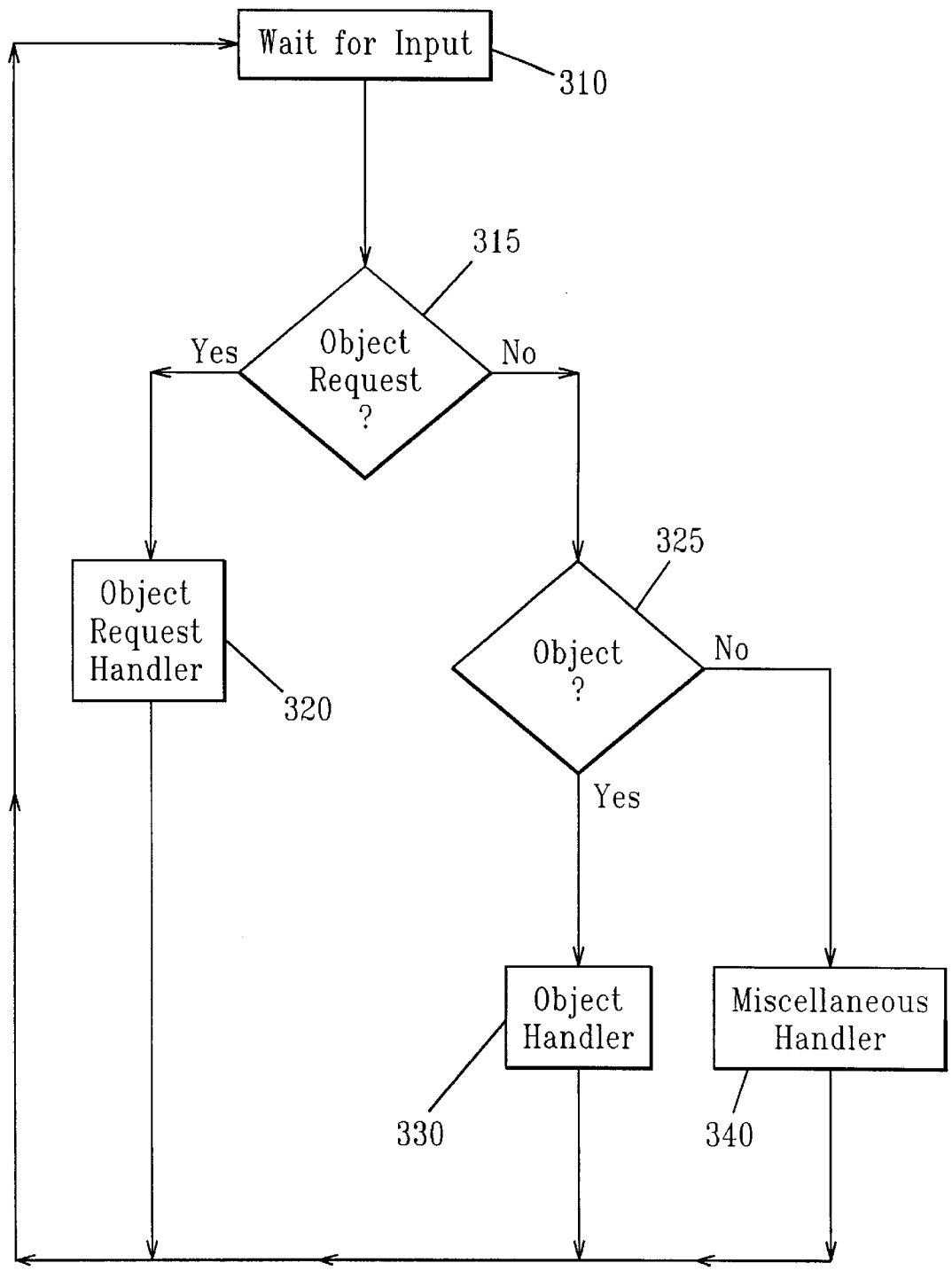
FIG. 3 depicts an example of the server logic.

FIG. 3 depicts an example of collaborative server logic having features of the present invention. As depicted, in step 310, the proxy server waits for an input. In step 315, depending upon the input received, different actions will be taken. If the input received is an object request (from the lower level proxy or client), in step 320, the object request handler (160) will be invoked. A detailed example of the object request handler is described with reference to FIG. 4. If in step 325, the input received is an object (from a higher level proxy or a content server), the object handler is invoked, in step 330. A detailed example of the object handler is described with reference to FIG. 5. In step 340, for other types of inputs (325) which are not the focus of the present invention, an appropriate miscellaneous handler (340) can be invoked. An example of these types of inputs is a command requesting a status report.

Figure 4:
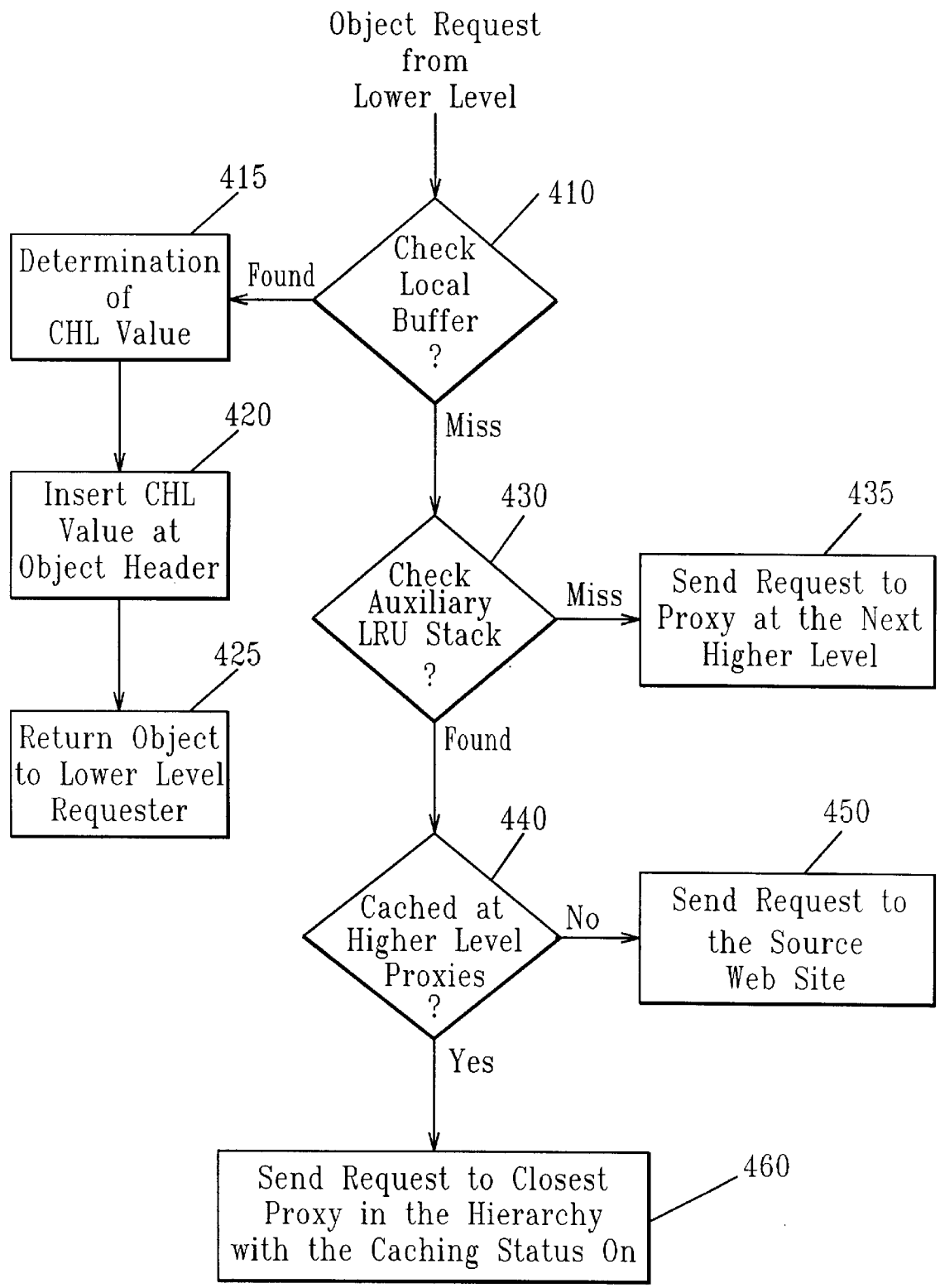
FIG. 4 depicts an example of the object request handler.

FIG. 4 depicts an example of the object request handler (160). As depicted, in step 410 the proxy checks if the requested object is in its local cache/buffer. If found in the local cache, in step 415, the CHL value of the object to communicate down the hierarchy is determined. An example of a method to derive the CHL value will be discussed with reference to FIG. 11. In step 420, the CHL value is then inserted into the object header. Preferably, the CHL value is inserted into the HTTP response header as the PICS category value of the "caching hierarchy" label. In step 425, the object (with its associated header) is communicated to the lower level requester. Preferably, if a cached object is referenced, a check should be made whether or not it is obsolete. If it is obsolete, then a time to obsolescence (TTO) may be recalculated and the admission logic re-applied to determine whether to continue to cache the object after a refresh.

In step 410, if the object is not found in the local cache, the auxiliary stack (125) is checked, in step 430. If not present in the stack, the proxy has no caching information on that object in the proxy hierarchy and in step 435, the object is requested from the next higher level proxy. If in step 430, the object is found in the auxiliary stack (125), in step 440 the CHL value is (128) examined to determine if it is cached at higher level proxy in the hierarchy. If so, in step 460, the object request may be sent to the closest proxy in the hierarchy with the caching status on as indicated by the CHL value. If in step 440, the object is indicated as not cached at any higher level proxy, in step 450 the object request may be sent to the source web location directly. The request may still be routed through the intermediate proxy servers in the higher level hierarchy.

Figure 5:
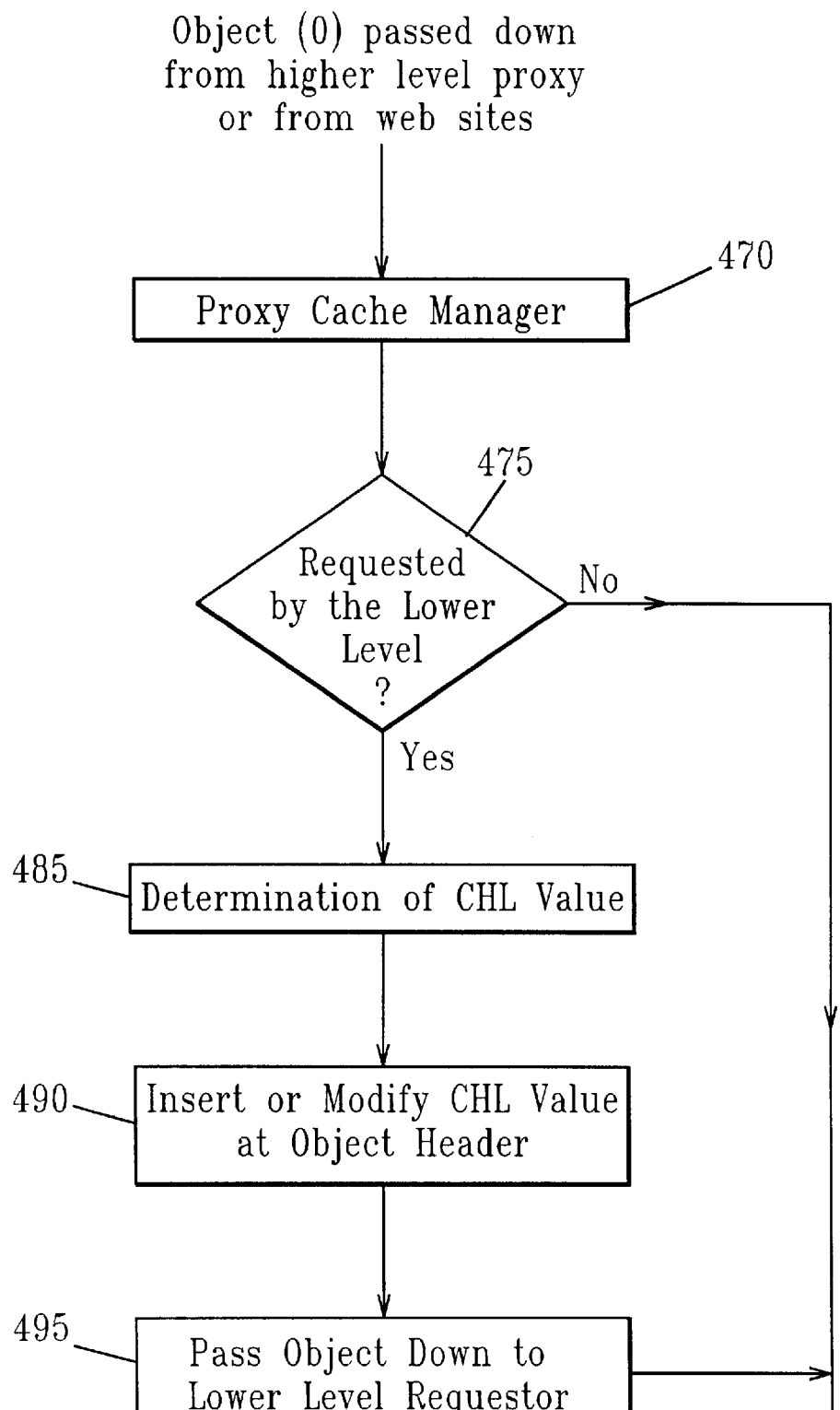
FIG. 5 depicts an example of the object handler.

FIG. 5 depicts an example of the object handler (170). As depicted, in step 470, if a requested object O is passed down from a higher level proxy server or a web site, the object handler (170) invokes a proxy cache manager (174) to determine whether the object O should be cached locally. An example of the proxy cache manager logic will be described with reference to FIG. 6. In step 475, it is determined whether the object O has been requested by a lower level server or by a client associated with the current server. If the request is local, then the object O is served to the requesting client. In step 485, if the object O is determined to have been requested by a lower level proxy or client, its associated CHL value (to pass down) will be derived (see FIG. 11 for details). In step 490, this CHL value is modified and/or inserted (if new) into the object header. In step 495, the object O is passed down to the lower level requester or client.

Figure 6:
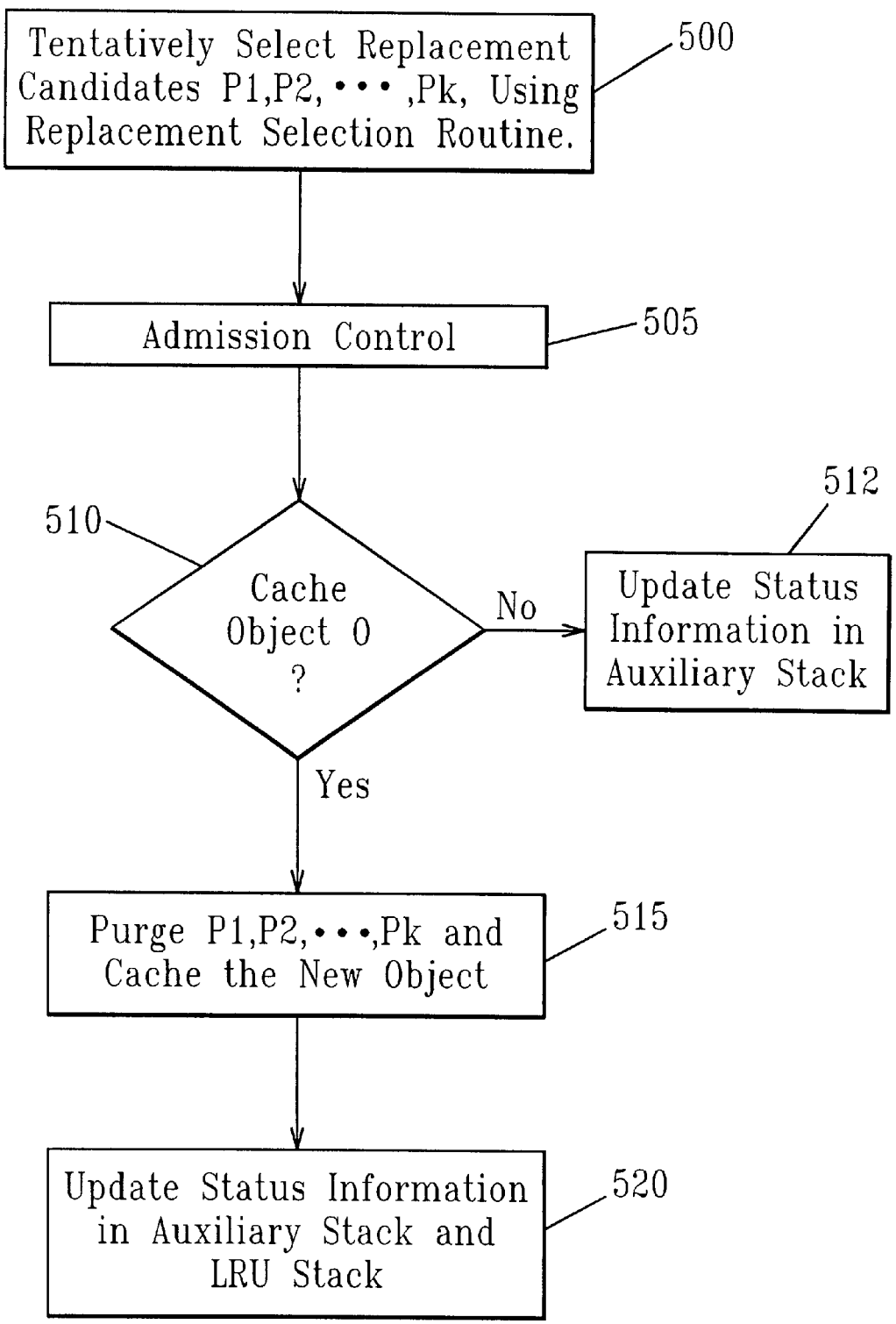
FIG. 6 depicts an example of the proxy cache manager.

FIG. 6 depicts an example of the proxy cache manager. Since object O is not in the cache (it has been passed down from the hierarchy or from a web server), it is possible that a replacement will take place. In step 500, one or more candidate objects P1 . . . Pk in the cache are tentatively identified for replacement. More detailed descriptions of the replacement selection (171) logic will be described with reference to FIGS. 7 and 8–9. In step 505, the admission control (171) logic checks whether an exchange of the object for objects P1 . . . Pk would be favorable. FIG. 10 includes a more detailed example of the admission control (171) logic. If in step 510, the admission control logic indicates that it is favorable to replace the objects P1 . . . Pk, then in step 515, the objects P1 . . . Pk are purged from the cache and the object O is cached. In step 520, the auxiliary stack (125) is updated with the status information for object O. The auxiliary stack status information preferably includes identities, CHL values, and time stamps of (popular) frequently accessed objects. This may be done by maintaining this stack using LRU rules. In step 510, even if the object is not cached, an entry for this object can be created, if needed, or updated in the auxiliary stack with its time stamp and CHL value, in step 512. In either case, the new CHL value is (the PICS category value attached to the caching label) obtained from the object header. If there is no PICS label in the object header, the CHL value will be set to zero.

Figure 7:
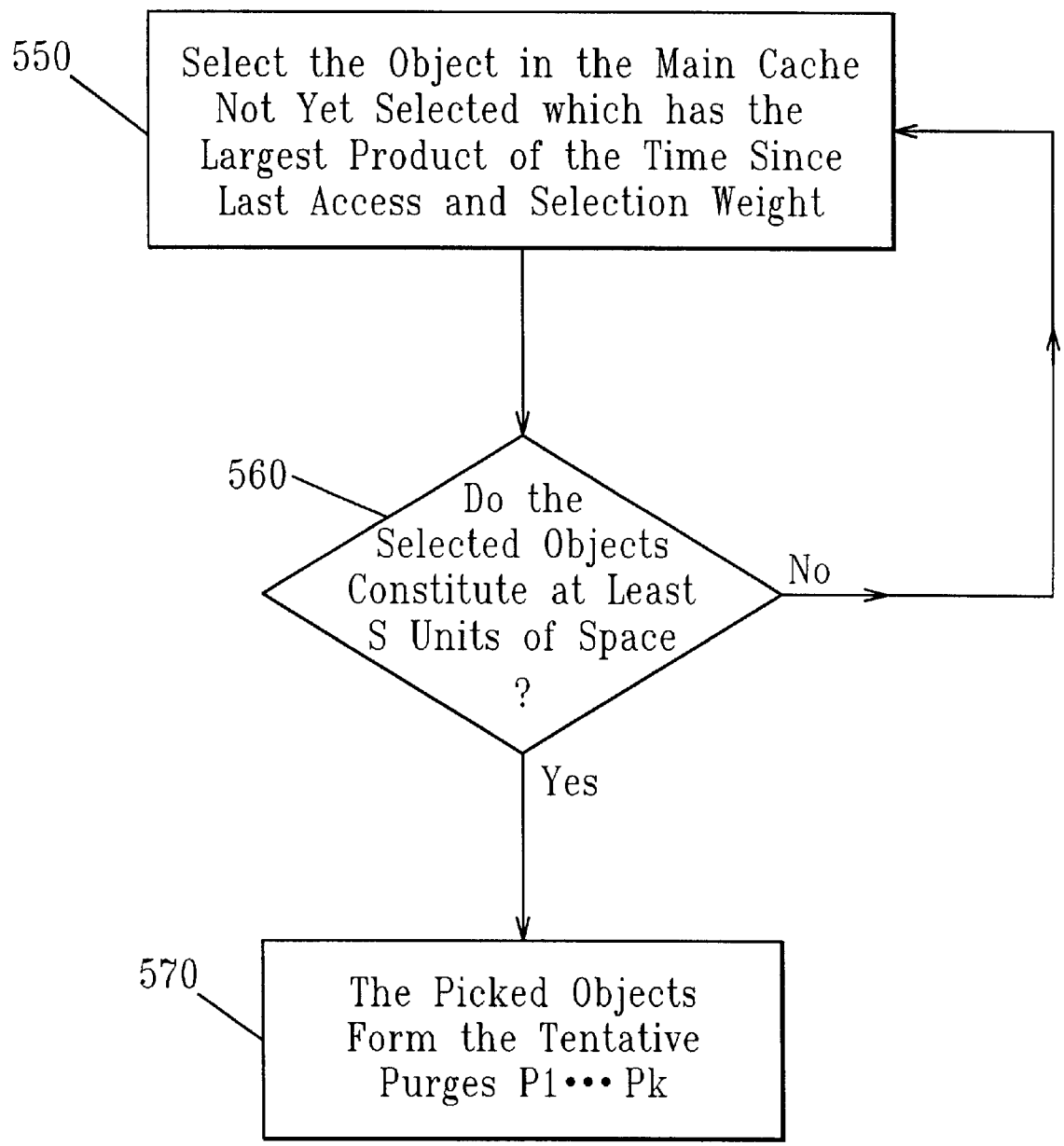
FIG. 7 depicts an example of the replacement selection logic.

FIG. 7 depicts an example of the replacement selection logic (172) for selecting candidate replacement objects (also referenced in step 500 of FIG. 6). Recall that, preferably objects of non-uniform size are selected as a function of a selection weight, wherein the selection weight of an object is a function of an object's size divided by a replacement cost of obtaining the object if it is not cached. The selection weight can be further adjusted by a factor on time to obsolescence (TTO).

As noted, the access time required to obtain an object (if it is not cached) may be used to represent the replacement cost. An approach which uses the access time for a previous access as an approximation for a current access will not work well in the presence of the caching hierarchy. This is due to the fact that the object may have been cached in intermediate proxies during the previous access. The present invention has features which advantageously provide knowledge on the caching status of the caching hierarchy.

Those skilled in the art will appreciate that given the caching information, many different techniques can be devised to estimate the access time. For example, as is conventional, a proxy server can periodically ping or probe each higher level proxy to determine the access time to that proxy. A more elaborate approach is to separately estimate the protocol overhead and the transmission time. The access time can be further adjusted to factor in the object's size.

The TTO recognizes that each object can become obsolete over time and the benefit of caching decreases as the time to obsolescence approaches. In some cases, a web page specifies an expected time to obsolescence. Generally, a web page header includes an indicator of the last time the page has been modified. The time since last modified can be used as an indication of the time between modifications of a web page. A fraction of this time interval can be used to estimate the TTO. For a given TTO, the effectiveness of caching is reduced by a factor of (1−1/beta) where beta is a ceiling function of the TTO divided by a time since last accessed.

Referring now to FIG. 7, assume that an object O takes S units of space (and is less than the total cache size). In step 550, select a candidate object having the largest product of the selection weight and the time since last accessed. In step 560, the size of the current set of selected objects is checked to determine whether they use at least S units of space. If not, the process returns to step 550 to select a next object. Otherwise, the currently selected set of objects form the tentative purges P1 . . . Pk. In order to improve processing time, an alternative method which uses multiple LRU stacks in order to perform the selection is described with reference to FIG. 9.

FIG. 8 depicts an example of the multiple LRU stacks (120). As depicted, each of the LRU stacks (165, 175, 180, 185) may contain selection weights that are within a geometric multiple of one another. Each entry could also have a time stamp associated with the object's last access. Thus, an object 191 having a selection weight value of one is associated with a LRU stack (165) having a range of selection weights less than or equal to one. Those skilled in the art will appreciate that although the example depicts four stacks having selection weights which are multiples of 2 (i.e., 1,2,4,8), there could be any number of stacks and the selection weight multiplier could be any constant A.

Figure 9:
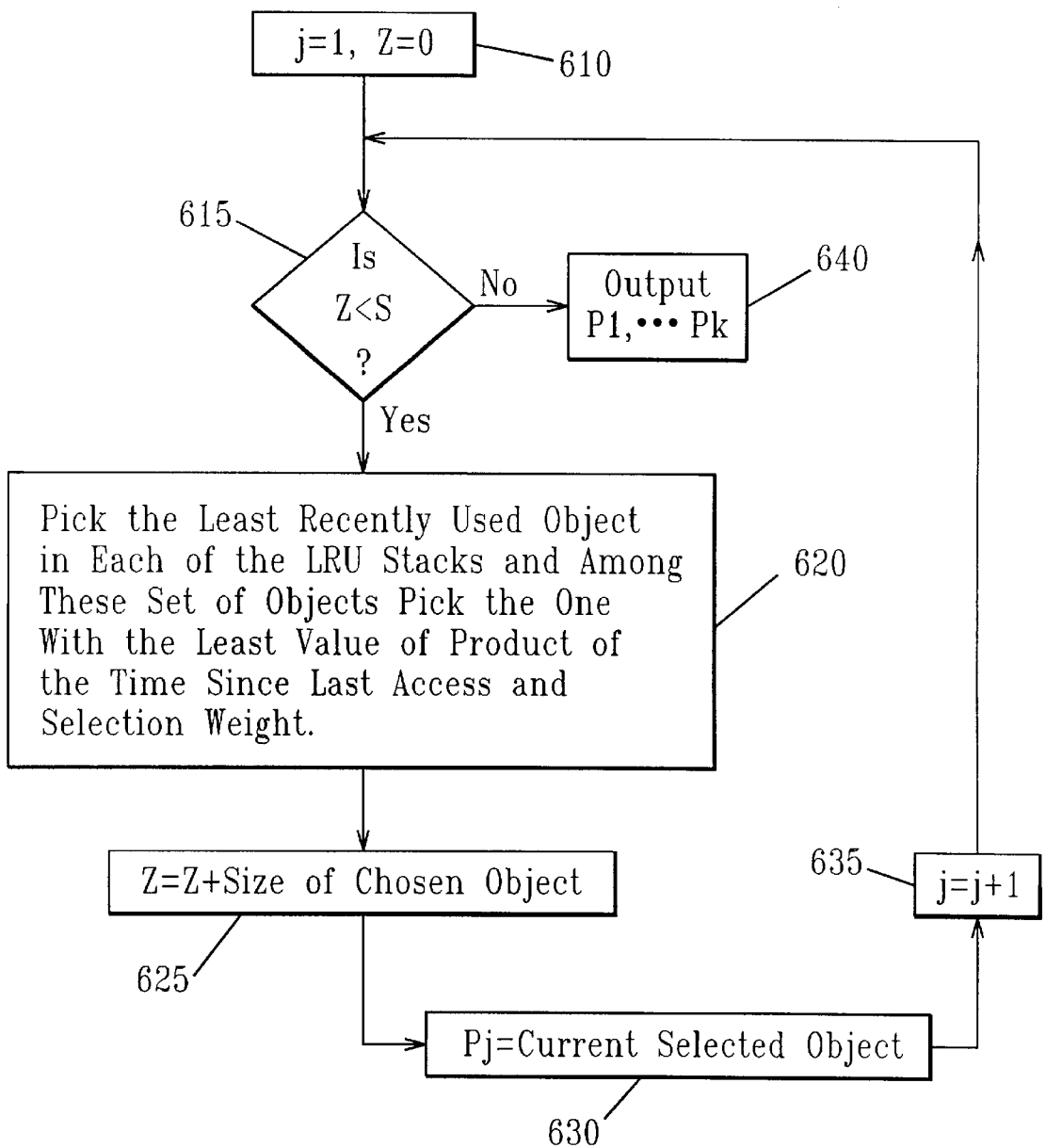
FIG. 9 depicts an example of an alternative replacement selection logic using multiple LRU stacks.
Figure 10:
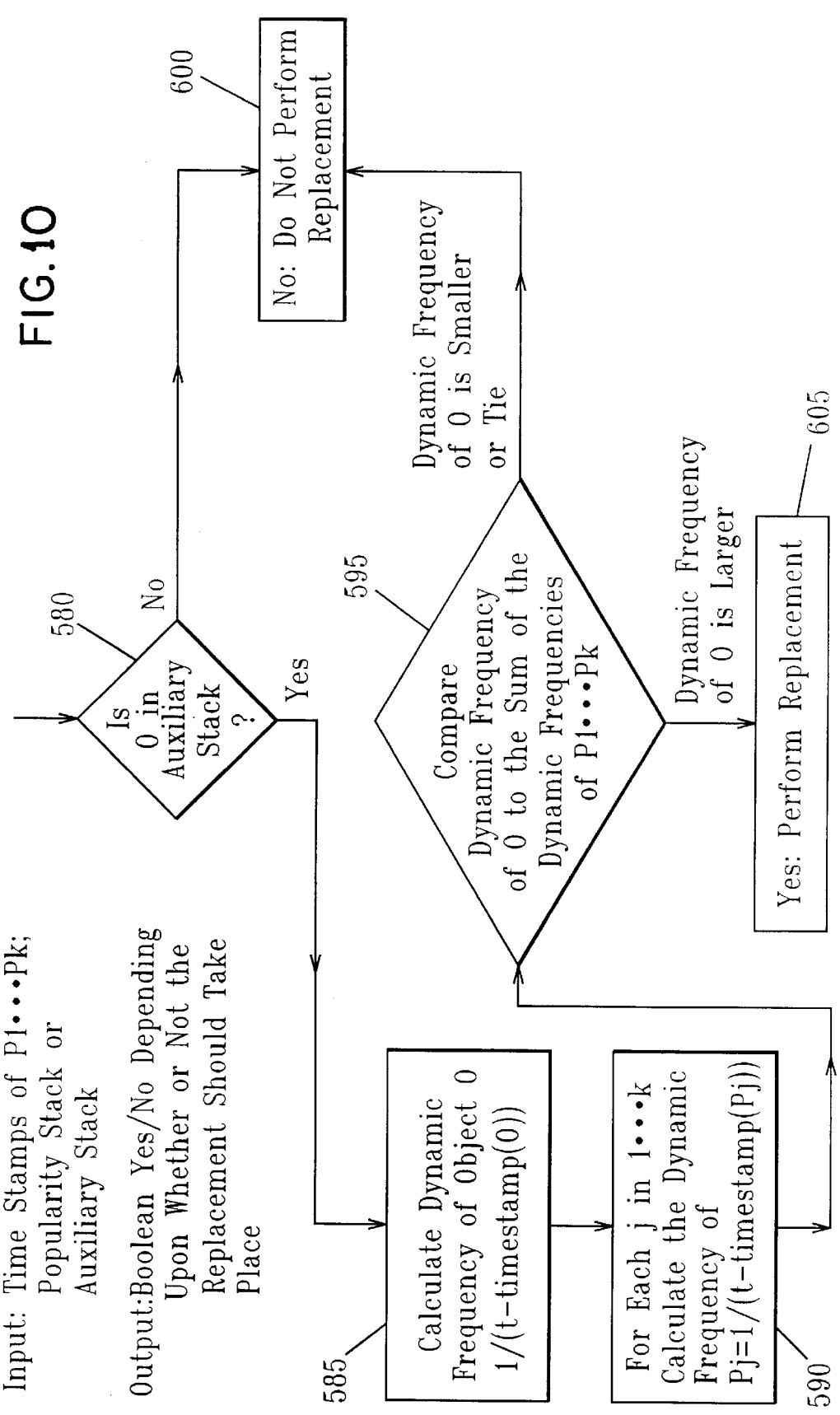
FIG. 10 depicts an example of the admission control logic.

FIG. 9 depicts an example of an alternative replacement selection (172) logic using multiple LRU stacks. As depicted, in step 610 a counter j is set to a value of 1 and the currently created space Z is set to a value of zero. In step 615, a check is made whether the space occupied by the set of chosen candidate replacement objects (none initially) is at least equal to the required space S. If not, in step 620 take the least recently used object (191, 192, 193, 194) from each of the LRU stacks (170, 175, 180, 185) and select the object having a largest value of the product of the selection weight and the time since last access. In step 625, the size of this object is added to the value Z, which is used to track the amount of created space. In step 630, the object Pj is set to the currently selected object and in step 635, the counter j is incremented by one. The process next returns to step 615 to compare the created space Z to S. In step 640, if Z≧S, then the selected set of objects P1 . . . Pk is output (to step 505).

FIG. 10 depicts an example of the admission control logic (171). The admission control logic may be invoked in step 505 of FIG. 6. A primary function of the admission control logic is to allow only objects which are frequently accessed (popular enough) to enter the cache. The admission control logic takes as its input the time stamps of the object O under consideration and the tentative purges P1 . . . Pk which were identified by the replacement selection logic (172). In order to perform the selection, the time stamps (of last access) may be maintained along with the object identities (126), e.g., URL, in the auxiliary stack (125). In step 580, it is determined if the object O is in the auxiliary stack (125). If not, in step 600, the object is deemed not popular enough, and the replacement is not made. Alternatively, if the object O is in the auxiliary stack (125), then the dynamic frequencies of object O and P1 . . .Pk are calculated in steps 580 and 590, respectively. Preferably, the dynamic frequency of an object is defined as an inverse of the time since last accessed. For example, assuming that the current time is t, the dynamic frequency of object O will be 1/(t-timestamp(O)), where timestamp(O) is the last access time of the object O recorded in the auxiliary stack. In step 595, the dynamic frequency of object O is compared to the sum of the dynamic frequencies of P1 . . . Pk. If the dynamic frequency of the object O is larger, then the replacement is made.

Figure 11:
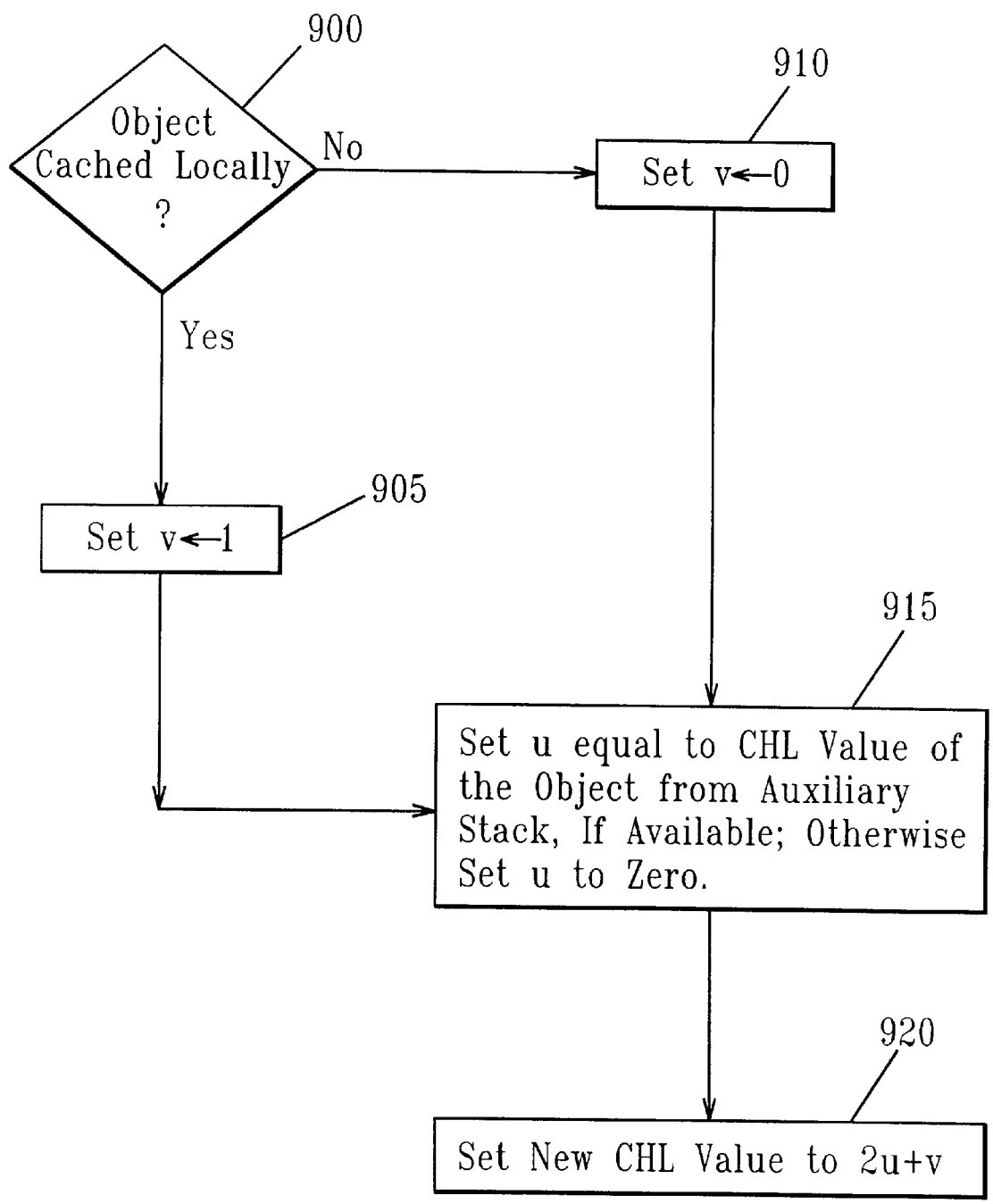
FIG. 11 depicts an example of logic for deriving a CHL value.

FIG. 11 shows an example of a method to determine the CHL value of an object. Based on whether the object is cached locally, variable v is set to a value of one, in step 905, or zero in step 910, respectively. In step 915, a variable u is initialized to the CHL value of the object from the auxiliary stack, if available. Otherwise, u is set to zero. In step 920, the new CHL value (to communicate down the proxy hierarchy) is set to 2u+v.

Those skilled in the art will appreciate that the collaborative caching scheme also works in a heterogeneous proxy server environment, where some of the proxies are conventional proxies which do not understand the collaborating protocol and do not participate in the collaboration. Here, each collaborative proxy server needs to know its level in the hierarchy. Furthermore, a modification should be made to the binary value representation of the CHL value. For a n-th level proxy, its CHL value for an object now consists of (n+1) bits and the k-th bit from the right has a value of one if the (n–k) level proxy is a collaborative proxy and has cached the object at the moment when it passed it down the hierarchy. Otherwise, the k-th bit is set to zero. The leftmost bit is always set to one.

Returning now to FIG. 1, consider for example the CHL value of an object A in a heterogeneous proxy server environment. Assume that the proxy server (30) at level-0 and the proxy server (40) at level-2 have cached object A and the proxy server (35) at level-1 is a conventional proxy which may or may not have cached the object A. The CHL value of object A at the proxy (50) at level-3 will be "101" in binary and the CHL value at the level-2 proxy (40) is "10" in binary, respectively.

A conventional (nonparticipating) proxy will neither interpret the CHL value in the header nor reset the CHL value. It simply ignores the CHL value in the header. For a collaborating at level k, upon receiving an object, it will multiply the CHL value in the header by powers of 2 until the CHL value becomes larger than or equal to 2k and less than 2(k+1). This will compensate for effects caused by nonparticipating proxies. This step is preferably done as a preprocessing step to step 470 in FIG. 5, and the CHL value (128) stored in the auxiliary stack (125) in step 512 or 520 of FIG. 6. Furthermore, in step 915 of FIG. 11, if the object is not found in the auxiliary stack, for the k-th level proxy, a variable u is set to (10 . . . 0) in binary where there are k zeros following the 1.

In the preferred embodiment of the present invention, a general collaborative cache management policy for web servers has been described. Those skilled in the art will appreciate, however, that the present invention is applicable to any kind of situation where the objects to be cached are of non-uniform size and/or is not restricted to an Internet or WWW application.

The present invention can also be extended to determine if the cached version of the object is up-to-date. The HTTP protocol has function which allows a lower level proxy (or client) to retrieve the header for an object via a HTTP HEAD request. According to this feature of the present invention, in response to a HTTP HEAD request, the up-to-date CHL value can be provided and the intermediate proxies adapted to examine the CHL value and update their stored values. Thus, the lower level proxy (or client) can obtain the current CHL value (stored in the header) of any specific object without significant additional overhead and without retrieving the object itself, just using the header.

If a caching proxy includes a storage hierarchy with different retrieval times, an additional PICS category can be used to indicate the level of the retrieval speed (129) of the storage for the cached object. The retrieval time can vary due to the speed of the particular type of storage media, (e.g., disk as compared to tape) or the computation time required to uncompress a compressed object.

Those skilled in the art will also appreciate that although the focus of the current invention is on collaboration between parent and child nodes in the hierarchy, it can be easily adapted to include collaboration between sibling nodes. For example if no proxy in the upper hierarchy contains the requested object, a proxy can also interrogate sibling proxies in the hierarchy. To avoid interrogating all sibling proxies (which can increase network traffic) one solution is to partition the cache (110) into vertical and horizontal caches. The vertical cache can be used for the proxy hierarchy as described hereinbefore. The horizontal cache (for sibling requests) can be used for caching objects based on an object request frequency from sibling proxies. For example, web objects can be partitioned (based on URL) among the sibling proxies for (horizontal) caching using a hashing algorithm. For each proxy, when an object cannot be kept in its vertical cache, only objects associated with its corresponding partition can be cached in the horizontal cache. Thus, for any object not available in the upper proxy hierarchy, only one sibling needs to be interrogated.

Thus, while we have described our preferred embodiments of our invention, with alternatives, it will be understood that those skilled in the art, both now and in the future, may make various improvements and enhancements which fall within the scope of the claims which follow. These claims should be construed to maintain the proper protection for the invention first disclosed.

We claim:

1. In a caching hierarchy including a plurality of nodes, a method of collaboratively caching objects wherein requests for objects are communicated up the hierarchy and objects are communicated down the hierarchy, the method comprising the steps of:

communicating both a caching status of a requested object not cached on a higher level node and the requested object, in response to a request for the requested object; and caching of the requested object by a lower level node as a function of the caching status of the requested object at a higher level node, in response to said communicating step.

2. The method of claim 1, wherein the hierarchy includes one or more clients and servers and wherein a PICS protocol is used to communicate the caching status of a higher level server, said communicating step further comprising the step of creating a caching label and using a PICS category value to represent the caching status.

3. The method of claim 2, wherein the requested object, further comprising the steps of:
   setting a binary value at a highest level in the hierarchy to indicate the caching status;
   creating and associating a caching label and the caching status with the requested object;
   interpreting the PICS category value to make a caching decision at the lower level; and
   modifying the PICS category value to reflect the caching decision at the lower level.

4. The method of claim 1, including a heterogeneous caching hierarchy wherein said caching step is not performed by all nodes in the hierarchy.

5. The method of claim 1, wherein a stack is maintained to track the caching status of the most recently referenced objects in the caching hierarchy, further comprising the steps of:
   setting a cache indicator to indicate the requested object as cached when it is communicated down the hierarchy; wherein the number of entries maintained in the stack is larger than the number of objects cacheable at the node.

6. The method of claim 5, further comprising the step of a node requesting a missing object as a function of the caching status of the object in the hierarchy.

7. The method of claim 5, wherein the stack is an LRU stack for tracking the caching status of one or more most recently requested objects in a higher level node, comprising the steps of:
   maintaining a caching status bit is for each higher level node; wherein the caching status bit identifies whether the requested object is cached at a corresponding node in the hierarchy.

8. The method of claim 5, further comprising the steps of:
   receiving a request for an object not in a cache associated with the current node;
   the current node communicating a request for the object not in the cache to a nearest higher level node associated with the caching status bit having a value of one; and
   the current node communicating a request for the object not in the cache to a source node if the caching status bit indicates that the object is not cached in the hierarchy.

9. The method of claim 1, further comprising the steps of:
   said communicating step comprising the step of communicating a caching status of the requested object at ancestors of the current node; and
   said caching step comprising caching by the lower level node of the requested object as a function of the caching status of the requested object at ancestors of the current node.

10. The method of claim 1, further comprising the step of:
    maintaining information on one of an access time and a replacement cost associated with the requested object at higher level nodes; wherein said caching step is a function of one of the access time and the replacement cost.

11. The method of claim 10, wherein said caching step is a function of an inverse of the access time.

12. The method of claim 1, wherein said caching step further comprises the steps of:
    maintaining a priority function on currently cached objects; and
    replacing one or more of said currently cached objects with the requested object as function of a time since said one or more of said currently cached objects was last accessed and a selection weight.

13. The method of claim 11, further comprising the step of assigning the selection weight as a function of a how frequently said currently cached objects are modified.

14. The method of claim 12, further comprising the step of assigning the selection weight as a function of the object size divided by the replacement cost to get the object.

15. The method of claim 13, further comprising the step of modifying the selection weight modified by a factor on time to obsolescence.

16. The method of claim 10, wherein the objects are of non-uniform size, comprising steps of:
    determining whether to admit the requested object to a cache based on the objects to be replaced, if the requested object is not in the cache; and
    if the requested object not in the cache is determined to be cacheable, replacing an object in the cache with the requested object as a function of a cached object size, a time since last requested, an estimated time to obsolescence (TTO), and the replacement cost.

17. The method of claim 16, further comprising the steps of: maintaining multiple LRU stacks, each stack corresponding to a stack range of selection weights; and adding information on a newly cached object to a corresponding stack range.

18. The method of claim 17, further comprising the step of partitioning stack ranges into a predetermined number of ranges according to a geometric progression.

19. The method of claim 16, further comprising the step of storing object information for each object request in an auxiliary stack; wherein said step of determining whether to admit a requested object to a cache is based on the object information.

20. The method of claim 19, wherein the object information includes an object identifier, and an object request time.

21. The method of claim 17, further comprising the step of examining one or more least recently requested object in each LRU stack to determine the replacement candidate.

22. The method in claim 16, further comprising the step of selecting an object replacement candidate with the minimum value of the product of the object size, the time since last requested, and an adjustment factor according to the TTO, divided by the replacement cost.

23. The method of claim 22, wherein the adjustment factor is a function of a time since the object was last modified and the time since last requested.

24. The method of claim 16 wherein the cache includes multiple hierarchical caches.

25. The method of claim 16, further comprising the step of determining when the object is obsolete; and determining if a refreshed copy of the object will be cached.

26. The method of claim 16, wherein said step of determining whether to admit the requested object to the cache is based on the time since last requested, and the TTO.

27. The method of claim 10, further comprising the step of estimating the replacement cost based on the caching status of the hierarchy.

28. The method of claim 1, wherein the caching hierarchy comprises one or more clients and proxy servers communicatively coupled to the Internet.

29. In a caching network comprising a plurality of nodes, a method of collaboratively caching objects, the method comprising the steps of:

communicating both a caching status of a requested object not cached on a first node, and the requested object, in response to a request for the requested object; and caching of the requested object by a second node as a function of the caching status of the requested object at the first node, in response to said communicating step.

30. The method of claim 29, wherein the network includes a caching hierarchy wherein requests for objects are communicated up the hierarchy and objects are communicated down the hierarchy, and wherein the first node is a higher level server and the second node is one of a client and a lower level server, further comprising the steps of:

said communicating step including the step of communicating down the hierarchy both the caching status of the requested object not cached on the higher level node, and the requested object, in response to the request for the requested object; and caching of the requested object by the lower level node as a function of the caching status of the requested object at the higher level server, in response to said communicating step.

31. The method of claim 29, wherein the nodes are sibling nodes.

* * * * *